United States Patent [19]

Haigh

[11] Patent Number: 4,981,742

[45] Date of Patent: Jan. 1, 1991

[54] DYE IMPERMEABLE, DISTORTION RESISTANT TEXTILE IDENTIFICATION PRODUCTS

[75] Inventor: Thomas I. Haigh, Northampton, Pa.

[73] Assignee: Penn Emblem Co., Philadelphia, Pa.

[21] Appl. No.: 318,043

[22] Filed: Mar. 2, 1989

[51] Int. Cl.<sup>5</sup> .................... B32B 3/02; B32B 5/06; B32B 7/08; B32B 27/12; B32B 27/36

[52] U.S. Cl. ......................... 428/64; 428/66; 428/81; 428/102; 428/193; 428/196; 428/200; 428/248; 428/252; 428/334; 428/337; 428/346; 428/354; 428/355; 428/913.3

[58] Field of Search ............... 428/334, 354, 355, 252, 428/64, 66, 81, 102, 193, 248, 337, 346, 913.3

[56] References Cited

U.S. PATENT DOCUMENTS

| | | | |
|---|---|---|---|
| 2,901,466 | 8/1959 | Kibler | 260/75 |
| 3,547,753 | 12/1970 | Sutton | 428/334 |
| 3,629,034 | 12/1971 | Kuroda | 156/219 |
| 3,657,060 | 4/1972 | Haigh | 428/175 |
| 3,816,211 | 6/1974 | Haigh | 156/309 |
| 3,944,454 | 3/1976 | Burgheimer | 428/79 |
| 3,974,010 | 8/1976 | Cox, Jr. | 156/93 |
| 4,269,885 | 5/1981 | Mahn | 428/216 |
| 4,423,106 | 12/1983 | Mahn | 428/207 |
| 4,717,621 | 1/1988 | So et al. | 428/354 |

*Primary Examiner*—James C. Cannon
*Attorney, Agent, or Firm*—Panitch Schwarze Jacobs & Nadel

[57] ABSTRACT

A dye impermeable, distortion resistant textile identification product comprises a first layer of woven fabric bonded to a second layer of dye impermeable, distortion resistant thermoplastic material, and a third layer of thermoplastic adhesive material bonded to the second layer. In an embroidered emblem, stitching extends through the first and second layers, and a third layer of dye impermeable thermoplastic material is bonded to the second layer overlying and bonded to the stitching. A fourth layer of thermoplastic adhesive material is bonded to the third layer. Methods for making the dye impermeable, distortion resistant textile identification products are also set forth.

25 Claims, 1 Drawing Sheet

DYE IMPERMEABLE, DISTORTION RESISTANT TEXTILE IDENTIFICATION PRODUCTS

BACKGROUND OF THE INVENTION

1. Field of the Invention

This invention relates to a textile identification product and more particularly to a dye impermeable, distortion resistant textile identification product and the method of making the same.

2. Description of Prior Art

Textile identification products are well-known for their use as emblems, patches, labels for laundry identification, computerized label tapes and the like. In this regard they are often sewn or heat sealed onto articles of wearing apparel or other fabric material of a general nature.

Current products in this field can withstand numerous heavy duty industrial washing and/or dry cleaning cycles without shrinking or puckering, when either heat sealed or sewn onto garments. Examples of such products are disclosed in U.S. Pat. Nos. 3,657,060 and 3,816,211.

U S. Pat. No. 3,657,060 describes an embroidered emblem comprising a fabric base bonded to a layer of thermoplastic adhesive material, wherein the fabric base contains the embroidered design. U.S. Pat. No. 3,816,211 describes a method for preparing the embroidered emblem disclosed in U.S. Pat. No. 3,657,060, comprising the steps of applying heat and pressure to the thermoplastic material while it is in contact with the fabric base and then permitting the emblem to cool while still under pressure. In these patents, the preferred thermoplastic adhesive is a polyurethane adhesive.

U.S. Pat. No. 3,974,010 discloses a method of making articles of aetzed embroideries on a thermoplastic backing to form a composite in which the thermoplastic backing is melt bonded to the embroideries. In a preferred embodiment, the articles of aetzed embroidery are prepared with an adhesive coating on one side, such that the articles are mounted by the adhesive coatings on a carrier strip for storage and ready removal.

U.S. Pat. Nos. 4,269,885 and 4,423,106 both disclose a laminated material formed of a layer of polyurethane or polyether and a layer of extruded polyester. This laminated material may then be applied to a garment or other material by applying sufficient heat and pressure so that the polyester layer becomes adhesively bonded to the garment or other material.

Despite advances in the industry, there is still a problem of the transference of dyestuffs to the garments from the emblem yarns and fabrics used to make the patches, emblems, etc., which is usually noticed when the identification products are removed from the garments. When the emblem is adhered to the garment by application of heat and pressure, the dyestuffs used to color the fabric of the emblem and/or the yarn of the embroidery portion of the emblem bleeds through even the thermoplastic adhesive backing onto the garment. Dry cleaning and/or laundering worsens the bleed through problem.

By using a relatively thick coating (at least about 8 mils) of the polyurethane thermoplastic adhesive material of the type referred to above in U.S. Pat. Nos. 3,657,060 and 3,816,211, a textile identification product acquires significant dye impermeability. However, the dye impermeable thermoplastic material of this invention used between the fabric layer and the thermoplastic adhesive layer is substantially less expensive than the polyurethane thermoplastic adhesive material. Additionally, less of the dye impermeable material of the present invention is required to provide dye impermeability to the product. As a result, the use of the dye impermeable thermoplastic material, along with a thinner coating of the thermoplastic adhesive material is a more cost-effective means of providing dye impermeability to the product, along with excellent adhesive properties, as compared to the use of a thick layer of the polyurethane adhesive material. Further, the presently preferred dye impermeable layer of the present invention also provides resistance to deformation of the textile identification product in subsequent printing or stitching operations.

Moreover, current manufacturing techniques cause stretching or deformation of emblems during processes such as screen printing or stitching operations. This stretching or deformation results in significant distortion of the printed or stitched design. The resulting product may then have to be discarded. In addition, computerized label tapes often undergo misalignment of printer sprocket holes when fed as a web to a computerized label printer. Such processing difficulties could be avoided by incorporating a layer of distortion resistant material into the textile identification product, in accordance with the present invention.

SUMMARY OF THE INVENTION

One aspect of the invention relates to an article of manufacture comprising a first layer of fabric, a second layer of dye impermeable thermoplastic material bonded to the first layer, and a third layer of thermoplastic adhesive material bonded to the second layer.

Another aspect of the invention relates to an article of manufacture comprising a first layer of fabric, a second layer of distortion resistant thermoplastic material capable of providing the article with resistance to stretching deformation during printing or stitching bonded to the first layer, and a third layer of thermoplastic adhesive material bonded to the second layer.

Still another aspect of the invention relates to a method of making an article of manufacture comprising providing a first layer of fabric, bonding to the fabric layer a second layer of dye impermeable, distortion resistant thermoplastic material capable of providing the article with resistance to stretching deformation during printing or stitching, and bonding a third layer of thermoplastic adhesive material to the second, dye impermeable, distortion resistant thermoplastic layer.

Yet another aspect of the invention relates to an emblem comprising a first layer of fabric, a second layer of distortion resistant thermoplastic material bonded to the first layer, stitching extending through the first and second layers, the distortion resistant layer being capable of providing the emblem with resistance to deformation during stitching, a third layer of dye impermeable thermoplastic material bonded to the second layer and overlying the stitching, and a fourth layer of thermoplastic adhesive material bonded to the third layer.

A further aspect of the invention relates to a method of making an embroidered emblem comprising providing a first layer of fabric, bonding a second layer of distortion resistant thermoplastic material to the fabric layer, stitching through the fabric layer and distortion resistant thermoplastic layer to provide an embroidered subassembly, the distortion resistant layer being capable of providing the fabric with resistance to deformation during stitching, bonding a third layer of dye impermeable thermoplastic material to the second, distortion resistant thermoplastic layer of the embroidered subassembly, such that the third, dye impermeable thermoplastic layer overlies and is bonded to the stitching extending through the second, distortion resistant thermoplastic layer, and bonding a fourth layer of thermoplastic adhesive material to the third, dye impermeable thermoplastic layer.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
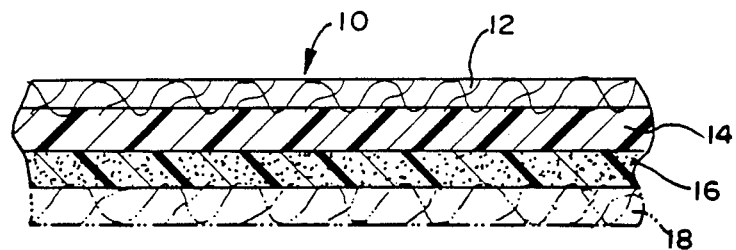
FIG. 1 is a sectional view of a portion of an article of manufacture constructed in accordance with a presently preferred form of the invention.

Referring to the drawings, wherein like numerals refer to like elements throughout the several views, FIG. 1 illustrates a cross sectional view of a portion of a first embodiment of an article of manufacture 10 in the form of a textile identification product, such as a label tape, an emblem blank or a printed textile identification product. FIG. 1 is enlarged and not shown to scale to more clearly illustrate the present invention.

Article 10 comprises a first layer of fabric 12, a second layer of dye impermeable and/or distortion resistant thermoplastic material 14 bonded to the fabric layer 12, and a third layer of thermoplastic adhesive material 16 bonded to the dye impermeable and/or distortion resistant layer 14.

FIG. 1 illustrates the bonding of the article 10, comprising layers 12, 14 and 16, to a garment or other material 18, typically, but not necessarily, a fabric material, indicated in phantom, since the material 18 does not form a part of the present invention.

The fabric layer 12 is a woven or non-woven textile fabric and may be made from any type of natural or synthetic textile material by techniques well known to those skilled in the art. Woven fabrics are presently preferred. Preferably, the fabric is polyester, cotton or combinations thereof. Preferred fabrics presently include 100% polyester, or polyester-cotton blends of about 65% polyester and about 35% cotton.

If desired, the fabric layer 12 may be coated or impregnated with various known soil resisting or stain repelling treatments to which layer 14 may be bonded.

Moreover, the fabric layer 12 is typically colored using textile dyes well-known to those skilled in the art. As is common knowledge, some dyestuffs are more colorfast than others and can withstand laundering, dry cleaning, ironing and heat treatment better than others. In addition, in one form of the embodiment of the invention illustrated in FIG. 1, the fabric layer 12 preferably is printed on its upper surface (in the orientation of FIG. 1) with a person's or company's name, identification number, logo or other design. As used herein, the term "design" means any standard or modified letters, numbers, geometric shapes, logotypes, recognizable or abstract designs or other indicia.

When a textile identification product is attached to a garment by a thermoplastic adhesive, and even by a polyurethane thermoplastic adhesive such as those used in U.S. Pat. Nos. 3,657,060 and 3,816,211, referred to above, there is a tendency for the dye of the fabric or the ink or dye of any design printed or otherwise applied to the fabric to bleed through the fabric layer and any thermoplastic adhesive layer which has been secured directly to the fabric layer onto a garment or other material to which the product is attached. In fact, some thermoplastic adhesives, including polyurethane, extract the dye from the dyed fabric of the label, emblem or the like and are responsible for the transfer of the dye to the garment or other material 18. The reverse can also occur, namely, transfer of dye from material 18 to the textile identification product 10. This may result in the discoloration of the garment not only directly adjacent to where the product is attached, but also in areas of the garment surrounding the product, due to dye or ink migration.

A primary characteristic of the dye impermeable layer 14 is that it prevents or substantially reduces the permeation, bleed through or transfer of dye or ink from the fabric layer 12 through the thermoplastic adhesive layer 16 to the garment or other material 18 during bonding of the textile identification product 10 to the material 18 through the application of heat and pressure.

The dye impermeable layer 14 also substantially reduces or prevents transfer or bleed through of adhesive material from the layer 16 to the outer surface of the fabric layer 12 (generally referred to as "strike through"), regardless of whether or not the fabric has been previously treated with a solution coating of adhesive penetrant reducing material. Thus, when the term "dye impermeable" is used herein, it also includes the characteristic of preventing or substantially reducing the strike through of adhesive to the outer surface of the fabric layer 12.

Moreover, in imprinting on or during subsequent stitching of a design through the fabric layer 12 of the label tape, emblem blank or printed emblem 10, the article 10 is stretched to provide good printing ink or dye transfer and proper stitching, typically using modern, multineedle machines. If the stretching deforms the article 10 as compared to its shape prior to and after printing or stitching, the printed or stitched design will be distorted and the article 10 may have to be discarded.

The layer 14, when used as a distortion resistant layer, significantly reduces or prevents stretchability of printed emblems during printing processes, such as screen printing, various transfer printing processes or the like, or during subsequent stitching operations, where the article 10 is used as an emblem blank, and alleviates misalignment of printer sprocket holes when the article 10 is fed as a web to a computerized label printer to make label tapes. When used as a distortion resistant material, the layer 14 should have a tensile modulus of elasticity of about $2.5 \times 10^4$ pounds per square inch (hereinafter "psi") to about $5.0 \times 10^5$ psi, and preferably, about $2.5 \times 10^5$ psi.

Preferably, the layer 14 is a material which provides both dye impermeability and distortion resistance to the article 10. In the presently preferred embodiment of the present invention the layer 14 is both a dye impermeable and distortion resistant layer. The layer 14 should be capable of bonding to the fabric layer 12 with a peel strength of at least 5 pounds per linear inch. In addition, the layer 14 should not be so thick or stiff that it makes the article 10 so stiff and inflexible that it is uncomfortable to wear. Where the article 10 is a label tape applied to the collar of a garment, flexibility is needed to prevent or minimize chafing the neck of the person wearing the garment containing the label tape.

A particularly suitable, commercially available material to be bonded to the fabric layer 12 to act as the dye impermeable and/or distortion resistant layer 14 is manufactured by Eastman Chemical Products, Inc. and is sold under the trademark KODAR PETG Copolyester 6763 (hereinafter "PETG"). PETG is a glycol-modified polyethylene terephthalate polymer. This modification is made by adding a second glycol, cyclohexanedimethanol, during the polymerization stages. One skilled in the art may readily make PETG or other suitable thermoplastic materials by following the procedures of U.S. Pat. No. 2,901,466, the disclosure of which is incorporated herein by reference.

The thickness range of the dye impermeable and/or distortion resistant thermoplastic layer is about 1 mil to about 5 mils, with a preferred thickness of about 3 mils.

A suitable thermoplastic adhesive material for the layer 16 to be bonded to the layer 14 for subsequent bonding to a garment or other material 18 is a polyester based polyurethane. Two particularly suitable, commercially available polyester based polyurethanes of this type are TUFTANE 310, manufactured by the Lord Corporation and DURAFLEX, manufactured by Deerfield Urethane, Inc. In addition, the use of a layer 14, as well as a thermoplastic adhesive layer 16, provides the desired distortion resistance referred to above.

The thickness range of the thermoplastic adhesive layer should be chosen to provide good adherence of the layer 16 to the layer 14, as well as to provide good adherence of the article 10 to a garment or other material 18. A suitable thickness for the layer 16 is about 3 mils to about 4 mils.

The article of manufacture 10 may be prepared by bonding the second, dye impermeable and/or distortion resistant layer 14 to the first, fabric layer 12 followed by bonding the third, thermoplastic adhesive layer 16 to the second layer 14. Any suitable bonding processes presently known to those skilled in the art may be used, such as melt bonding by various techniques including, for example, hot bar bonding, dielectric bonding and ultrasonic bonding techniques, adhesive bonding using thermoplastic or solution adhesives, or any other technique to provide the product with the appropriate bond strength between layers. Melt bonding is the presently preferred technique, conducted at a temperature, pressure and time sufficient to melt bond the second layer 14 to the first layer 12, and the third layer 16 to the second layer 14.

Alternatively, the second, dye impermeable and/or distortion resistant layer 14 and the third, thermoplastic adhesive layer 16 may be co-extruded to form a two-layer composite. This two-layer composite may then be bonded to the first, fabric layer 12 at a temperature, pressure and time sufficient to melt bond the two-layer composite to the first layer 12.

Preferably, the article of manufacture 10 is prepared by the simultaneous bonding of the second, dye impermeable and/or distortion resistant layer 14 to the first, fabric layer 12 and the third, thermoplastic adhesive layer 16 to the second layer 14. This simultaneous bonding is conducted at a temperature, pressure and time sufficient to melt bond the three layers together.

The simultaneous bonding of the second, dye impermeable and/or distortion resistant thermoplastic layer 14 to the first, fabric layer 12 and the third, thermoplastic adhesive layer 16 to the second layer 14 is conducted at a temperature, pressure and time, for example, of about 370° F. to about 450° F. at about 10 psi to about 30 psi for about 3 seconds to about 14 seconds, followed by cooling to room temperature. As used herein, when "psi" designates interplaten bonding pressure, "psi" means pounds per square inch. Preferably, this simultaneous melt bonding step is conducted at about 425° F. at about 30 psi for about 6 to about 8 seconds, followed by cooling to room temperature. This simultaneous bonding of the three layers is a more cost-effective method of producing the article of manufacture 10, as opposed to the independent bonding of layer 14 to layer 12, and layer 16 to layer 14. The parameters for melt bonding a co-extruded two-layer composite of layers 14 and 16 to the fabric layer 12 are generally the same as set forth above for the simultaneous bonding of the layers together.

Figure 2:
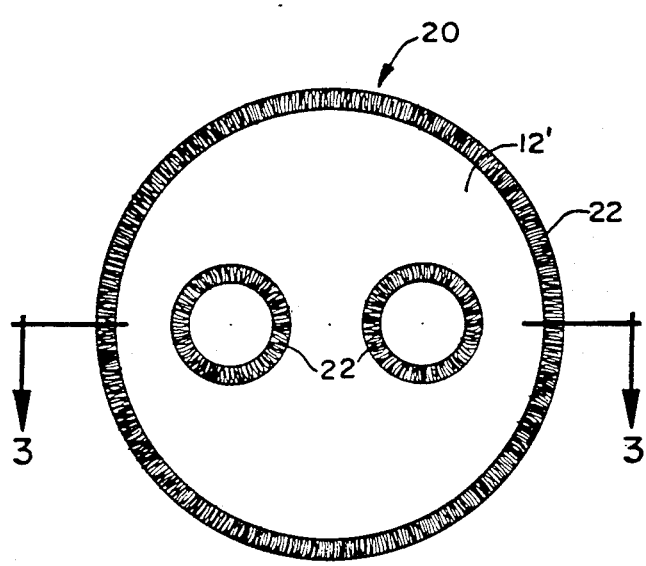
FIG. 2 is a plan view of an embroidered emblem in accordance with another presently preferred form of the invention.
Figure 3:
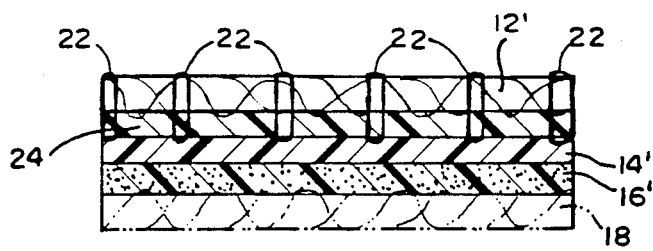
FIG. 3 is a sectional view taken along line 3—3 of FIG. 2.

A second embodiment of the present invention in the form of a preferred embroidered emblem 20 is depicted in FIGS. 2 and 3. FIG. 3 is enlarged and not shown to scale to more clearly illustrate the invention. The emblem 20 comprises a first layer of fabric 12' and a second layer 24 of distortion resistant thermoplastic material bonded to the fabric layer 12'. Stitching 22 extending through both layers 12' and 24 forms an embroidered border and a central design exemplified by two circles, although of course, any other design, with or without an embroidered border, could be formed by the stitching 22 for the embroidered emblem. A third layer 14' of dye impermeable thermoplastic material is bonded to the second layer of distortion resistant thermoplastic material 24. The third layer 14' overlies and is bonded to the stitching 22 and a fourth layer 16' of thermoplastic adhesive material is bonded to the third layer of dye impermeable thermoplastic material 14'.

The embroidered emblem 20 is illustrated in FIG. 3 as being attached by the thermoplastic adhesive layer 16' to a garment or other material 18, which is shown in phantom, since the garment or other material 18 forms no part of the present invention.

In the preferred embodiment of embroidered emblem 20, the second layer 24 has the primary characteristic of providing distortion resistance during manufacture of the emblem. When emblem fabric is stitched to make embroidered emblems, a web of fabric is typically stretched on a tentering frame so that multiple needle stitching machines can efficiently embroider a number of designs simultaneously on the fabric web. Sometimes, and more frequently than desired, the fabric web is stretched to the point of distortion. That is, if the embroidered designs are intended to be circles, as depicted by the circles 22 of FIG. 2, and the fabric is stretched too much prior to or during the embroidery stitching process, the designs may be deformed or distorted into ovals or ellipses when the stretching tension on the fabric web is released. If this occurs, the embroidered emblems would likely be rejected. By initially bonding the layer 24 of distortion resistant thermoplastic material to the fabric layer 12' (the fabric layer 12' may be a fabric web) before the fabric web is mounted on the tentering frame, deformation or distortion of the intended design is prevented or substantially reduced.

The third layer 14' of dye impermeable thermoplastic material has the primary characteristic of providing dye impermeability to the finished product. To do so, the dye impermeable layer 14' must overlie and be bonded to the stitching 22. Otherwise, the dye from the yarn or thread used to make the stitching 22 may be transferred through the thermoplastic adhesive layer 16' to the garment or other material 18. While layer 24 may impart dye impermeability against transfer of dye from the emblem fabric 12' to the garment or other material 18, when the stitching 22 extends through the layer 24, the layer 24 cannot prevent dye transfer from the stitching. Accordingly, in the embodiment of FIGS. 2 and 3, emblem 20 requires dye impermeable layer 14' to overlie and be bonded to the stitching 22 extending through layers 12' and 24.

Preferably, each of layers 24 and 14' should be capable of providing both distortion resistance and dye impermeability to the emblem 20.

The fabric layer 12' of embroidered emblem 20, like the fabric layer 12 of the article of manufacture 10, is a woven or non-woven textile fabric and may be made from any type of natural or synthetic textile material by techniques well known to those skilled in the art. A woven fabric is presently preferred. Preferably, the fabric is polyester, cotton or combinations thereof. Preferred fabrics presently include 100% polyester, or polyester-cotton blends of about 65% polyester and about 35% cotton.

As in the article of manufacture 10, a particularly suitable, commercially available material to be bonded to the fabric layer 12' to act as the distortion resistant layer 24 is the cyclohexanedimethanol-modified polyethylene terephthalate polymer, PETG. PETG is also a particularly suitable material to be bonded to the stitching 22 and the distortion resistant layer 24 to act as the dye impermeable layer 14'.

The thickness range of the distortion resistant thermoplastic layer is about 1 mil to about 3 mils, and preferably, about 2 mils. The thickness range of the dye impermeable thermoplastic layer is about 1 mil to about 5 mils, and preferably, about 3 mils. The combined thickness of the distortion resistant thermoplastic layer and the dye impermeable thermoplastic layer is not more than about 8 mils, and preferably, about 6 mils.

Further, as in the article 10, a suitable thermoplastic adhesive material for the layer 16' to be bonded to the layer 14' for subsequent bonding to a garment or other material 18 is a polyester based polyurethane thermoplastic adhesive layer, for example, either TUFTANE 310 or DURAFLEX.

The thickness range of the thermoplastic adhesive layer is about 3 mils to about 5 mils, and preferably, about 4 mils.

The embroidered emblem 20 may be prepared by bonding the second, distortion resistant thermoplastic layer 24 to the first, fabric layer 12' to form a subassembly of layers 12' and 24. Subsequent to stitching a design through the subassembly, the third, dye impermeable thermoplastic layer 14' is bonded to the stitching 22 and the second layer 24 of the embroidered subassembly. A fourth, thermoplastic adhesive layer 16' is then bonded to the third layer 14'. As in the article of manufacture 10, the preferred bonding technique is melt bonding, although any other suitable technique may be used, such as those previously described. The melt bonding steps are conducted at a temperature, pressure and time sufficient to melt bond the second layer 24 to the first layer 12', the third layer 14' to the stitching 22 and the second layer 24, and the fourth layer 16' to the third layer 14'.

The bonding of the second, distortion resistant thermoplastic layer 24 to the first, fabric layer 12 is conducted at a temperature, pressure and time, for example, of about 370° F. to about 450° F. at about 10 psi to about 30 psi, for about 3 seconds to about 10 seconds, followed by cooling to room temperature. Preferably, this melt bonding step is conducted at about 425° F. at about 30 psi for about 3 to about 5 seconds, followed by cooling to room temperature.

Preferably, the embroidered emblem 20 may be prepared by the simultaneous bonding of the third, dye impermeable thermoplastic layer 14' to the second, distortion resistant thermoplastic layer 24 of the embroidered subassembly and the stitching 22, and the fourth, thermoplastic adhesive layer 16' to the third layer 14'. This simultaneous bonding is conducted at a temperature, pressure and time sufficient to melt bond the embroidered subassembly and layers 14' and 16' together.

The simultaneous bonding of the embroidered subassembly to the third and fourth layers 14 and 16' is conducted at a temperature, pressure and time, for example, of about 370° F. to about 450° F. at about 10 psi to about 30 psi for about 3 seconds to about 14 seconds followed by cooling to room temperature. Preferably, this simultaneous melt bonding step is conducted at about 425° F. at about 30 psi for about 5 to about 9 seconds, followed by cooling to room temperature. As in the article of manufacture 10, this simultaneous bonding is a much more cost-effective means of producing the emblem, as opposed to the independent bonding of layer 14' to layer 24 of the subassembly, and layer 16' to layer 14'.

The melt bonding is preferably performed using a flat bed indexing press which has both a heatable platen opposing a heatable or non-heated pressure platen, and a cooling platen, or by using two belt, oven heated, continuous roll type equipment. Both types of equipment are well known to those skilled in the art and are available from commercial sources. Heat can be applied to the layers to be bonded from heat sources located on one side (typically above) the product, on the opposite side (typically below) the product, or on both sides of the product.

Alternatively, the third, dye impermeable thermoplastic layer 14' and the fourth, thermoplastic adhesive layer 16' may be co-extruded to form a two-layer composite prior to bonding. This two-layer composite may then be bonded to the distortion resistant thermoplastic layer 24 of the embroidered subassembly at a temperature, pressure and time sufficient to melt bond the two-layer composite to the embroidered subassembly of the first layer 12' and second layer 24. The parameters for melt bonding a co-extruded two-layer composite of layers 14' and 16' to the embroidered subassembly are generally the same as described above for the simultaneous bonding technique.

The present invention will now be described in more detail with reference to the following specific, non-limiting examples.

EXAMPLE 1

Preparation of a Laundry Identification Label Tape

A layer of colored, lightweight woven fabric comprising 65% polyester and 35% cotton (4.2 oz/yd$^2$), a layer of dye impermeable thermoplastic material (PETG, 2 mils thick), and a layer of thermoplastic adhesive material (TUFTANE 310, 3 mils thick) were placed in a flat bed indexing press. The layers were simultaneously bonded together by heating a lower platen to 425° F. and pressing the layers between the lower, heated platen and an upper, sponge rubber coated platen for about 6 seconds under a pressure of about 30 psi. The label tape was then cooled to room temperature.

Labels were removed from the label tape by die cutting the labels from the label tape web. Labels were melt bonded to a white, shirt-weight fabric at a temperature of about 400° F. under a pressure of about 18 psi for about 12 seconds. The labels were then removed from the fabric by heating and peeling the labels off of the fabric. The portion of the fabric to which the label had been applied was only very slightly darker than the surrounding fabric areas, primarily due to remnants of the thermoplastic adhesive remaining in the fabric after the label was removed, but it appeared that there was substantially no dye transferred from the label to the fabric.

Prior art labels were made using the same label fabric and 4 mils of the same adhesive, but did not use the intermediate PETG layer. The prior art labels were applied to the same shirt-weight fabric under the same conditions as the labels of the present invention. When the prior art labels were removed, the fabric under the label was colored the same color as the labels, but slightly lighter in shade than the original labels. The labels of the present invention showed a marked improvement as compared to the prior art labels.

EXAMPLE 2

Prevention of Adhesive Strike Through

A label according to the present invention and a prior art label made following the procedure of Example 1 were tested to determine the degree of strike through of the thermoplastic adhesive to the outer surface of the label fabric under typical conditions used in the field to bond the labels to a garment or other fabric.

The labels were melt bonded to a white, shirt-weight fabric at a temperature of about 400° F. under a pressure of about 18 psi for about 15 seconds. Upon inspection, the prior art label showed significant adhesive strike through, evidenced by a more shiny outer surface of the label fabric. The label of the present invention showed no evidence of adhesive strike through. The outer surface of the label fabric in the label of the present invention had the same, dull or non-shiny appearance as the label fabric had before it was used to make the label or before the label was applied to the garment fabric.

In addition, when a portion of the labels were removed from the garment fabric by heating and peeling the portion off of the fabric, the dye transference results were the same as those noted in Example 1, except that the area of the fabric under the label of the present invention was even whiter compared to the corresponding area in the test of Example 1.

EXAMPLE 3

Preparation of a Blank for a Printed or Embroidered Emblem

A layer of colored woven fabric comprising 100% polyester (7.0 oz/yd$^2$), a layer of dye impermeable, distortion resistant, plastic material (PETG, 3 mils thick), and a layer of thermoplastic adhesive material (TUFTANE 310, 4 mils thick) were placed in a flat bed indexing press. The heating platen was heated to about 425° F. Following the procedure of Example 1, all three layers were simultaneously bonded together at a pressure of about 30 psi for about 8 seconds. The product was then cooled to room temperature and blanks were cut from the product. A blank was melt bonded to a white, shirt-weight fabric at a temperature of about 400° F. under a pressure of about 30 psi for about 15 seconds. The blank was then removed from the fabric by a solvent. The portion of the fabric to which the blank had been applied was only very slightly darker than the surrounding fabric areas, primarily due to remnants of the thermoplastic adhesive remaining in the fabric after the blank was removed. It appeared that dye was not transferred from the blank to the fabric.

Two prior art blanks were made using the same blank fabric following the procedure previously set forth in this Example. One prior art blank (Blank No. 1) was made using 5 mils of the same adhesive used to make the blank of this invention. The other blank (Blank No. 2) was made using 8 mils of the same adhesive. The prior art blanks were applied to the same white, shirt-weight fabric as the blank of this invention using the same parameters, except that Blank No. 1 was applied using only top heat (the heated platen was on top of the blank) and Blank No. 2 was applied using only bottom heat (the heated platen was on the bottom of the fabric).

When the prior art blanks were removed, the fabric under Blank No. 1 was colored the same color as the blanks, but slightly lighter in shade than the original blank fabric. The blank of the present invention showed a marked improvement compared to the prior art Blank No. 1. The fabric under prior art Blank No. 2 was only slightly darker than the surrounding fabric areas, primarily due to remnants of the thermoplastic adhesive remaining in the fabric. The dye impermeability of Blank No. 2 was generally equivalent in this test to the blank of the present invention, apparently due to the thicker adhesive layer. Blank Nos. 1 and 2 were substantially more susceptible to stretching deformation and distortion than the blank made according to the present invention.

EXAMPLE 4

Preparation of an Embroidered Emblem

Step 1: Preparation of an embroidered subassembly

A layer of distortion resistant thermoplastic material (PETG, 2 mils thick) was melt bonded to a layer of woven fabric comprising 100% polyester (7.0 oz/yd$^2$) using a flat bed indexing press at a temperature of about 425° F., and a pressure of about 30 psi for about 3 seconds. This two-layer subassembly was then cooled to room temperature. An embroidered subassembly was made by stitching a design (an American flag design) using red, white and blue stitching through both layers of the subassembly.

Step 2: Preparation of a finished embroidered emblem

A layer of dye impermeable thermoplastic material (PETG, 4 mils thick) was bonded to the embroidered subassembly of Step 1 and, simultaneously, a layer of thermoplastic adhesive material (TUFTANE 310, 3 mils thick) was bonded to the dye impermeable layer using a flat bed indexing press. The bonding was conducted at a temperature of about 425° F., under a pressure of about 30 psi for about 8 seconds. The finished embroidered emblem was then cooled to room temperature.

The embroidered emblem was melt bonded to a white, shirt-weight fabric at a temperature of about 400° F. under a pressure of about 18 psi for about 15 seconds. The emblem was then removed from the fabric by a solvent. The portion of the fabric to which the emblem had been applied was only imperceptibly (to the naked eye) darker than the surrounding fabric areas, primarily due to remnants of the thermoplastic adhesive remaining in the fabric after the emblem was removed. There appeared to be substantially no dye transfer from the emblem to the fabric.

A prior art emblem was made using the same label fabric, stitching yarn and 4 mils of the same adhesive as the emblem of the present invention, but not using the intermediate PETG layers. The prior art emblem was applied to the same shirt-weight fabric under the same conditions as the emblem of the present invention. When the prior art emblem was removed, the fabric under the emblem was colored the same colors as the emblem, but lighter in shade than the original emblem. The emblem of the present invention showed a marked improvement compared to the prior art emblem.

The present invention may be embodied in other specific forms without departing from the spirit or essential attributes thereof and, accordingly, reference should be made to the appended claims, rather than to the foregoing specification, as indicating the scope of the invention.

I claim:

1. An article of manufacture comprising a first layer of fabric, a second layer of dye impermeable thermoplastic material comprising a glycol-modified polyethylene terephthalate polymer bonded to the first layer, and a third layer of thermoplastic adhesive material bonded to the second layer.

2. The article according to claim 1, wherein the fabric is a woven fabric selected from the group consisting of polyester, cotton and combinations thereof.

3. The article according to claim 1, wherein the second, dye impermeable thermoplastic layer is about 1 mil to about 5 mils thick.

4. The article according to claim 1, wherein the third, thermoplastic adhesive layer comprises a polyurethane.

5. The article according to claim 1, wherein the third, thermoplastic adhesive layer is about 3 mils to about 4 mils thick.

6. The article according to claim 4, wherein the fabric is a woven fabric selected from the group consisting of polyester, cotton and combinations thereof.

7. The article according to claim 6, wherein the article comprises a textile identification product.

8. An article of manufacture comprising a first layer of fabric, a second layer of distortion resistant thermoplastic material comprising a glycol-modified polyethylene terephthalate polymer capable of providing the article with resistance to stretching deformation during printing or stitching bonded to the first layer, and a third layer of thermoplastic adhesive material bonded to the second layer.

9. The article according to claim 8, wherein the fabric is a woven fabric selected from the group consisting of polyester, cotton and combinations thereof.

10. The article according to claim 8, wherein the second, distortion resistant thermoplastic layer is about 1 mil to about 5 mils thick.

11. The article according to claim 8, wherein the second, distortion resistant thermoplastic material has a tensile modulus of elasticity of about $2.5 \times 10^4$ psi to about $5.0 \times 10^5$ psi.

12. The article according to claim 8, wherein the third, thermoplastic adhesive layer comprises a polyurethane.

13. The article according to claim 8, wherein the third, thermoplastic adhesive layer is about 3 mils to about 4 mils thick.

14. The article according to claim 12, wherein the fabric is a woven fabric selected from the group consisting of polyester, cotton and combinations thereof.

15. The article according to claim 14, wherein the article comprises a textile identification product.

16. An emblem comprising a first layer of fabric, a second layer of distortion resistant thermoplastic material comprising a glycol-modified polyethylene terephthalate polymer bonded to the first layer, stitching extending through the first and second layers, the distortion resistant layer being capable of providing the emblem with resistance to deformation during stitching, a third layer of dye impermeable thermoplastic material bonded to the second layer and overlying the stitching, and a fourth layer of thermoplastic adhesive material bonded to the third layer.

17. The emblem according to claim 16, wherein the fabric is a woven fabric selected from the group consisting of polyester, cotton and combinations thereof.

18. The emblem according to claim 16, wherein the second, distortion resistant thermoplastic layer is about 1 mil to about 3 mils thick.

19. The emblem according to claim 16, wherein the third, dye impermeable thermoplastic layer comprises a glycol-modified polyethylene terephthalate polymer.

20. The emblem according to claim 16, wherein the third, dye impermeable thermoplastic layer is about 1 mil to about 5 mils thick.

21. The emblem according to claim 16, wherein the combined thickness of the second, distortion resistant thermoplastic layer and the third, dye impermeable thermoplastic layer is not more than about 8 mils.

22. The emblem according to claim 16, wherein the fourth, thermoplastic adhesive layer comprises a polyurethane.

23. The emblem according to claim 16, wherein the fourth, thermoplastic adhesive layer is about 3 mils to about 4 mils thick.

24. The emblem according to claim 16, wherein the third, dye impermeable thermoplastic layer comprises a glycol-modified polyethylene terephthalate polymer and the fourth, thermoplastic adhesive layer comprises a polyurethane.

25. The emblem according to claim 24, wherein the fabric is a woven fabric selected from the group consisting of polyester, cotton and combinations thereof.

* * * * *